RICHARD J. ROSA
INVENTOR.

United States Patent Office 3,091,709
Patented May 28, 1963

3,091,709
HALL CURRENT GENERATOR
Richard J. Rosa, Reading, Mass., assignor to Avco Corporation, Cincinnati, Ohio, a corporation of Delaware
Filed Mar. 28, 1960, Ser. No. 18,033
10 Claims. (Cl. 310—11)

The present invention relates to a magnetohydrodynamic (hereinafter abbreviated "MHD") generator, and more particularly, to such a generator that employs Hall currents to produce power.

In general terms, MHD generators produce electric power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes within the generator. The gas may exhaust to a sink, which may simply be the atmosphere; or, in more sophisticated systems, the gas may exhaust to a recovery system including pumping means for returning the gas to the source.

Several different gases may be used; for instance, the gas may simply be air, or may comprise inert gases, such as helium or argon. To promote electrical conductivity, the gases are heated to high temperature and may be seeded with a substance that ionizes readily at the operating temperature of the generator. For seeding purposes, sodium, potassium, cesium, or an alkali metal vapor may be used. Regardless of the gas used, and the manner of seeding, the resulting gases comprise a mixture of electrons, positive ions, and neutral atoms which, for convenience, may be termed "plasma."

In the conventional MHD generator, the plasma flows through a magnetic field, which is directed perpendicular to the direction of plasma flow. The movement of the electrically conductive plasma relative to the field produces an E.M.F. that is normal both to the direction of flow of the plasma and the magnetic field, the current flowing transversely of the field between opposed electrodes at the sides of the generator. In such a generator, a separation of positive and negative electrical charges occurs along the length of the plasma stream, producing a potential gradient, known as the "Hall potential," which promotes longitudinal circulation of current internally of the generator. In a conventional MHD generator, such longitudinal currents cause energy losses which are detrimental to the operation of the generator, and various schemes have been devised to prevent their formation. It is possible, however, to build an MHD generator that takes advantage of the Hall potential, as in the present invention.

Briefly described, the novel MHD generator of this invention comprises a duct and a magnetic field normal to the axis of the duct. Movement of plasma through the duct and the field induces an electromotive force between opposed electrodes that are interconnected to accommodate circulation of current transversely of both the magnetic field and the direction of plasma flow. The terminal electrodes, i.e., the first and last electrodes along the length of the duct, are connected to an external load, making possible circulation of Hall current longitudinally through the plasma and the load circuit. The arrangement of elements is not only quite simple and effective but also minimizes heat and viscous drag losses, as will be explained. The geometry also simplifies the creation of a strong magnetic field through the duct of the generator. To distinguish this type of generator from a conventional MHD generator, it will be termed for convenience a "Hall current generator."

In view of the foregoing, it will be apparent that a broad object of the invention is to provide an improved Hall current generator.

Another object of the invention is to provide a generator in which current flows longitudinally through plasma, passing through the generator, to terminal electrodes which may be connected to an external circuit.

Another object of the invention is to provide a Hall current generator having, intermediate the terminal electrodes, opposed electrodes that are interconnected.

Still another object of the invention is the provision of a Hall current generator that is capable of producing electric power at high voltage with great efficiency.

Other objects of the invention are to provide a generator characterized by:

a. Reduced heat loss to the surrounding environment
b. Reduced viscous drag losses
c. A strong magnetic field over an appreciable volume of the generator The novel features that I consider characteristic of my invention are set forth in the appended claims; the invention itself, however, both as to its organization and method of operation, together with additional objects and advantages thereof, will best be understood from the description of a specific embodiment when read in conjunction with the accompanying drawings, in which:

Figure 1:
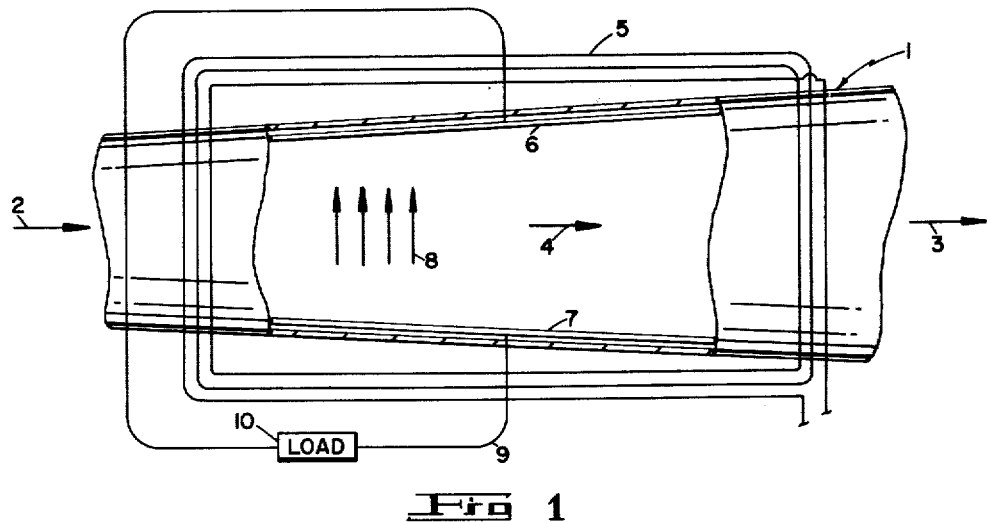
FIGURE 1 is a diagrammatic representation of a conventional MHD generator.

A knowledge of the general principles of MHD generators will promote an understanding of the present invention. For this reason, there is shown in FIGURE 1 a schematic of a conventional MHD generator. As illustrated in that figure, the generator comprises a tapered duct, generally designated 1, to which high temperature, high pressure, electrically conductive plasma is introduced, as indicated by the arrow at 2, and from which it exhausts, as indicated by the arrow at 3. The pressure at the exit of the duct is lower than at its inlet; and for this reason, the plasma moves at high velocity through the duct, as indicated by the arrow at 4. By properly choosing the pressure differential and the shape of the duct, the plasma can be made to move through the duct at substantially constant velocity which is desirable, although not necessary, to the operation of the generator. Surrounding the exterior of the duct is a continuous electrical conductor in the form of a coil 5 to which a unidirectional electrical current may be supplied from any conventional source or from the generator itself. Flow of electrical current through the coil establishes a magnetic flux through the duct, perpendicular to the direction of plasma flow and the plane of the paper.

Within the duct are provided opposed electrodes 6 and 7. These electrodes may extend along the interior of the duct parallel to the direction of plasma movement and may be positioned opposite one another on an axis perpendicular to both the direction of plasma movement and the magnetic flux. High velocity movement of the electrically conductive plasma through the magnetic field induces a unidirectional E.M.F. between the electrodes, such as indicated by the arrows at 8. The electrodes 6 and 7 are connected by conductor 9 to a load 10 through which electrical current flows under the influence of the E.M.F. induced between the electrodes.

Since electrons are lighter than ions and hence have a higher mobility, they will, in general, carry most of the current in an MHD generator. Since the forces exerted by the magnetic field are exerted on the current carriers, the electrons naturally experience most of the forces arising from their movement in the field.

As already mentioned, an electron current is induced between the electrodes by the cross product of the velocity of the plasma and the magnetic field. For the preferred arrangement where the velocity of the plasma is at right angles to the magnetic field, the cross product is equal to the arithmetical product of the vectors since the sine of the angle between them is one. The magnetic field acts on the current, creating a force tending to retard motion of the electrons longitudinally down the duct with the rest of the plasma. The ions, on the other hand, being much greater in mass than the electrons, only experience small forces as they move in the magnetic field and tend to be carried downstream with the plasma. Thus, a separation of charges occurs, resulting in the creation of an electric field longitudinally of the duct. This longitudinal field is frequently called the "Hall field" since the phenomena involved are similar to those giving rise to the so-called "Hall effect" observed some time ago in solid conductors. The potential, associated with the "Hall field," may be called the "Hall potential."

The forces, acting on the electrons, are transmitted by them to the rest of the plasma particles by collisions. Further, the movement of plasma particles is retarded by collision with the ions which, although carried downstream with the rest of the plasma, are held by the electric field existing between them and the upstream electrons. In overcoming the forces resulting from collisions with the ions and electrons, the plasma does work. This is as would be expected in a device for generating electrical power.

The idea of using Hall potential in a generator in itself is not broadly new. The Karlovitz et al. Patent 2,210,918, which issued on August 13, 1940, entitled "Process for the Conversion of Energy and Apparatus for Carrying Out the Process," describes an early form of Hall generator. The device disclosed by Karlovitz et al., is however, characterized by large losses, both viscous and thermal, because of the large surface to volume ratio of the annular flow passage through which the working fluid passes. Bearing in mind that electrical conductivity of the fluid is dependent upon its high temperature, it will immediately be apparent that a device built according to the teaching of Karlovitz will be characterized by serious heat losses through the relatively large surface areas present. Further, an annular geometry is a difficult geometry in which to create a strong magnetic field over any appreciable volume which is critically important to practical generator operation. As will now be explained, the present invention provides a novel form of generator that is not characterized by such shortcomings.

Figure 2:
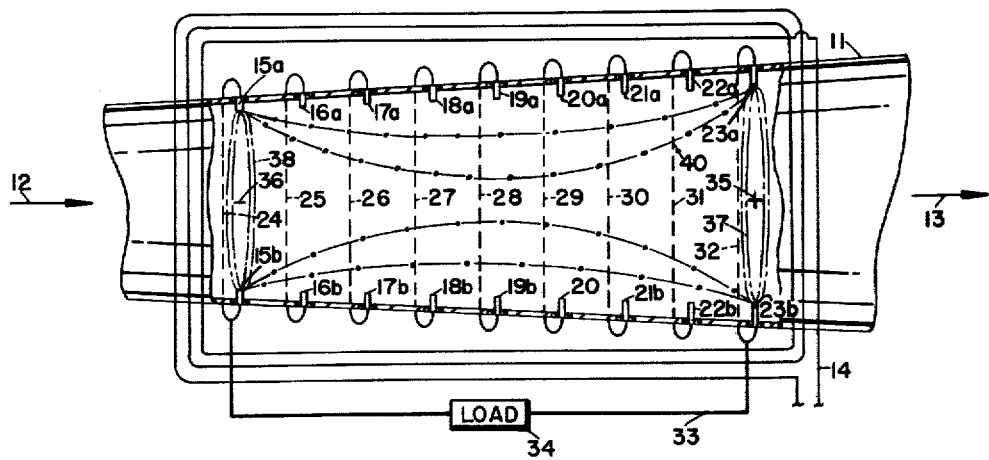
FIGURE 2 is a diagrammatic representation of a novel Hall current generator arranged in accordance with the teaching of this invention.

Attention may now be directed to the Hall current generator of FIGURE 2. As illustrated therein, a tapered duct 11 is provided to which a high temperature, high pressure electrically conductive plasma is introduced at 12 and from which it exhausts at 13. As in the generator of FIGURE 1, a continuous coil 14 is provided adjacent the generator through which may pass current from any conventional source, or from the generator itself, to produce magnetic flux through the duct perpendicular to the direction of plasma flow and the plane of the paper. Secured to the top and bottom walls of the duct, and electrically insulated therefrom, are a plurality of electrodes. These may be arranged in opposed pairs along axes perpendicular to both the direction of plasma flow and the magnetic flux. For convenience, opposed electrodes are designated by the same reference number, the individual electrodes being indicated by the presence of a letter appended to the number. Thus, electrodes 15$a$ and 15$b$ are provided on opposite sides of the duct; similarly with the electrodes 16$a$; 16$b$—23$a$; 23$b$. The opposed pairs of electrodes may be interconnected by electrical conductors 24—32. The end pairs of electrodes 15$a$—15$b$ and 23$a$—23$b$ may be conventionally termed "terminal electrodes" and are connected through conductor 33 to load 34.

As has been explained, a separation of charges and a potential gradient occurs longitudinally of the plasma stream. The existence of the gradient is indicated by the plus sign 35 downstream and the minus sign 36 upstream of the plasma. The voltage difference between the downstream and upstream regions of the plasma stream may be several thousand volts under open circuit conditions (conductor 33 disconnected from load 34).

The current flow $j_x$ parallel to the plasma stream, indicated by dot and dash lines 40 in FIGURE 2, may be determined from the following equation:

$$j_x = \frac{\sigma}{1+\Omega^2}(\Omega uB - \Omega E_y - E_x)$$

in which:

$\sigma$=scalar conductivity of the plasma
$\Omega = \omega\tau$
$\omega$=electron cyclotron frequency in radians/sec.
$\tau$=electron means free time between collisions with plasma particles in seconds
$B$=magnetic field strength
$E_y$=potential gradient between electrodes transverse of plasma stream
$E_x$=Hall potential gradient longitudinally through plasma stream
$u$=macroscopic velocity of plasma stream (The values for $\omega$ and $\tau$ for any given plasma can be calculated by using the principles set forth in "Physics of Fully Ionized Gases" by Lyman Spitzer, Jr., Interscience Publishers, Inc., 1956, and other standard reference works.)

It is to be noted that if the transverse electron current cannot flow (i.e., if the opposed electrodes are open circuited), then the electrons will not be retarded and the Hall field will not appear. In terms of the currents flowing in the gas, the Hall field is $$E_x = \frac{\omega\tau}{\sigma}j_y - \frac{1}{\sigma}j_x \quad \text{(Ref. Spitzer supra)}$$

where $j_x$=longitudinal or "Hall" current and $j_y$=transverse or "conduction" current. Now one can prevent $j_x$ from flowing by methods as described elsewhere and take power out via the $j_y$, in which case the Hall field $E_x$ serves merely to help transmit the $j_y x$ B forces from the electrons to the ions (and thence to the neutral plasma particles). On the other hand one can allow the $j_y$ to flow freely (zero load impedance across "y" direction) so as to get the maximum Hall field, and then take power out by letting Hall current flow against the Hall field, this current being led out via a downstream electrode, passed through the load, and returned through the upstream electrode.

Because of joule heating, which is proportional to the product of the square of the current flow and the reciprocal of the conductivity of the plasma, it is desirable to operate the generator with a relatively high Hall potential and a relatively small current flow. To be efficient, conditions must be conducive to a large Hall effect, i.e., $\omega\tau$ must be large, preferably greater than three.

By positioning the electrodes at the opposite sides of a generally cylindrical duct and connecting the load to the terminal electrodes, a general configuration can be attained that is highly efficient, principally by virtue of minimizing heat loss through the outside walls of the duct. This results from the ideal configuration of a generator of the type disclosed in which the cross sectional flow area through the duct approaches a circle and the length to diameter ratio can be made less than 20 to 1, preferably less than 10 to 1. In this way, the surface area of the generator duct is minimized for a given mass flow of pasma. The importance of minimizing heat transfer through the walls will be immediately apparent when it is recognized that the plasma is supplied to the generator at a temperature preferably in excess of 5000° F.

To accommodate planar electrodes, it is desirable to use a duct of rectangular configuration. This may be done without departing from the fundamental principles of the invention.

The generally tubular shape of the duct simplifies the provision of a strong magnetic field transverse to the direction of plasma flow. In contrast to an annular configuration, the magnetic field windings can easily be positioned parallel to and along the entire length of the duct providing a strong field throughout the entire interior volume of the duct.

As explained in connection with the conventional MHD generator, the movement of the electrically conductive plasma relative to the magnetic field establishes an E.M.F. between the opposed electrodes. The conductors interconnecting these electrodes provide closed circuits and, therefore, permit current to flow transversely of the duct between the electrodes. This current gives rise to electron movement and a Hall potential in a manner already described. The relative movement of electrons in opposition to the movement of the plasma stream and against retarding electrical field due to load impedance provides the desired generator action.

Because of the voltage drop at the electrodes, the flow of current transverse of the generator is not entirely unimpeded; however, if the E.M.F. developed in the plasma stream between opposed electrodes is large compared to the electrode voltage drop, the impedance will be insignificant. This can be accomplished by making plasma velocity $u$ and magnetic field $B$ large, since the generated E.M.F. transverse of the gas stream is a function of these quantities. The E.M.F. between electrodes is also a function of the distance between the electrodes, which should be kept relatively large. An E.M.F. in the order of 1000 volts can be realized in this manner, and, since the total voltage drop for both electrodes can be made small, in the order of 10–20 volts, electrode losses can be made negligible.

In view of the fact that the power is extracted from the generator through the terminal electrodes, and the fact that the current flows longitudinally through the entire cross section of the plasma stream, it is possible to arrange the terminal electrodes as annular rings, as indicated schematically by phantom lines at 37 and 38. If annular electrodes are used, conductors 24 and 32 may be omitted since current may flow from the plasma stream to all portions of the annular electrodes and thence to the conductor 33.

Although for convenience, a linear generator is shown in FIGURE 2, i.e., a generator in which the duct is defined by linear elements, it will be apparent to those skilled in the art that the duct could have a curved configuration without departing from the teaching of the invention. Even in a curved duct, an optimum ratio of length to diameter can be realized.

Though Hall currents are regarded as detrimental in a conventional MHD generator, by following the teachings of the present invention, it is possible to build a useful generator in which the Hall currents are effective in producing useful power output.

Having described a preferred embodiment of my invention, I claim:

1. In combination in a Hall current generator employing a high velocity stream of electrically conductive gas for generating electricity, a duct for conveying the gas stream, an electrically conductive coil adjacent said duct for conducting electricity and establishing a magnetic field through said duct normal to the direction of gas flow, a plurality of electrically insulated electrodes supported by said duct in electrical communication with the gas stream, said electrodes being disposed on opposite sides of said duct and arranged in pairs on axes perpendicular to both the magnetic field and the gas stream, the first pair of said electrodes being interconnected, the last pair of said electrodes also being interconnected, a load circuit interconnecting the first and last pairs of said electrodes, and an electrical interconnection between said electrodes of each pair intermediate said first and last electrode pairs.

2. In combination in a generator employing a stream of electrically conductive gas for generating electricity, a duct for conveying the gas stream, a plurality of opposed electrodes disposed along the length of said duct in contact with the gas stream, opposed pairs of said electrodes being aligned on axes normal to the direction of gas flow through said duct, means for establishing a magnetic field through said duct normal to the direction of gas flow and the axes of said electrodes, and a load circuit interconnecting the first and last pairs of opposed electrodes, said electrodes of each pair intermediate said first and last electrode pairs being electrically interconnected.

3. In combination in a Hall current generator employing a high velocity stream of electrically conductive gas for generating electricity, a duct for conveying the gas stream, an electrically conductive coil adjacent said duct for conducting electricity and establishing a magnetic field through said duct normal to the direction of gas flow, a pair of spaced annular electrodes within the duct in contact with the gas stream, a load circuit interconnecting said annular electrodes, and a plurality of opposed electrodes in contact with the gas stream intermediate said annular electrodes, said opposed electrodes being interconnected to accommodate current flow transverse of the gas stream and the magnetic field.

4. In combination in a Hall current generator employing a high velocity stream of electrically conductive gas for generating electricity, a duct for conveying the gas stream, means for establishing a magnetic field through said duct normal to the direction of gas flow, means in electrical contact with the gas for accommodating flow of electric current transverse of said duct generated by movement of the electrically conductive gas relative to the magnetic field, the transverse flow of current in the presence of the magnetic field causing a longitudinal separation of electrical charges whereby a potential is established longitudinally of said duct, and electrode means associated with said duct for accommodating current flow under the influence of the longitudinal potential gradient.

5. Apparatus as defined in claim 4 in which said last named electrode means comprises terminal electrodes, at least one terminal electrode being located upstream and at least one terminal electrode being located downstream of the region of transverse current flow within said duct.

6. In combination in a generator employing a high velocity stream of electrically conductive gas for generating electricity, a duct for conveying the gas stream, a plurality of electrodes disposed along the length of said duct in contact with the gas stream, said electrodes being electrically insulated from the duct and being disposed in opposed pairs on axes normal to the direction of gas flow through said duct, means for establishing a magnetic field through said duct normal to the direction of gas flow and the axes of said electrodes, the movement of the conductive gas relative to the field inducing an E.M.F. between said opposed electrodes transversely of the gas stream, said electrodes of each pair being electrically interconnected to accommodate current flow under the influence of the transverse E.M.F., the current flow transverse of the gas stream and in the presence of the magnetic field creating a Hall potential within the gas stream longitudinally of said duct, and additional electrodes in contact with the gas stream for accommodating current flow under the influence of the Hall potential.

7. In combination in a Hall current generator employing the high velocity stream of electrically conductive gas for generating electricity, a linear duct of generally circular cross section for conveying the gas stream, an elongated electrically conductive coil adjacent said duct for conducting electricity and establishing a magnetic field through said duct normal to the direction of gas flow, means in electrical contact with the gas for accommodating flow of electrical current transversely of said duct, said transverse current being generated by movement of the electrically conductive gas relative to the magnetic field established by said coil, the transverse flow of current in the presence of the magnetic field causing a longitudinal separation of electrical charges whereby a potential is established longitudinally of said duct, and electrode means associated with said duct subjected to the longitudinal potential gradient.

8. Apparatus as defined in claim 7 in which said means in electrical contact with the gas for accommodating flow of electric current transverse of said duct comprises a plurality of electrodes provided at spaced intervals along said duct between said last named electrode means.

9. Apparatus as defined in claim 8 and in addition a load circuit connected between said last named electrode means.

10. In combination in a Hall current generator employing a moving stream of electrically conductive plasma for generating electricity, means for conveying the plasma, means for establishing a magnetic field through the plasma normal to its direction of flow, means in electrical contact with the plasma for accommodating flow of electric current transverse of said stream generated by movement of the plasma relative to the magnetic field, the transverse current flow relative to the magnetic field causing separation of electrical charges longitudinally of the plasma stream whereby a Hall potential gradient is established longitudinally within the plasma, a load circuit, and means connected to said load circuit and in contact with the plasma for accommodating current flow longitudinally through the plasma and through said load circuit under the influence of the Hall potential.

References Cited in the file of this patent

FOREIGN PATENTS 841,613    Germany _____ June 16, 1952

OTHER REFERENCES

Electronics, November 27, 1959, pages 82 and 84, "Space Travel Generator: How It Works."

Disclaimer 3,091,709.—*Richard J. Rosa*, Reading, Mass. HALL CURRENT GENERATOR. Patent dated May 28, 1963. Disclaimer filed June 27, 1963, by the assignee, *Avco Corporation*.

Hereby enters this disclaimer to claims 1 through 10 of said patent.

[*Official Gazette September 17, 1963.*]